(12) United States Patent
Nordback

(10) Patent No.: US 10,031,779 B2
(45) Date of Patent: Jul. 24, 2018

(54) MANAGING COMPUTING RESOURCES AND REDUCING EXECUTION TIME USING PARALLEL PROCESSES

(71) Applicant: Konica Minolta Laboratory U.S.A., Inc., San Mateo, CA (US)

(72) Inventor: Kurt Nathan Nordback, Portland, OR (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 169 days.

(21) Appl. No.: 15/085,822

(22) Filed: Mar. 30, 2016

(65) Prior Publication Data
US 2017/0286165 A1   Oct. 5, 2017

(51) Int. Cl.
*G06F 9/46* (2006.01)
*G06F 9/50* (2006.01)

(52) U.S. Cl.
CPC .......... *G06F 9/5005* (2013.01); *G06F 9/5016* (2013.01); *G06F 9/5027* (2013.01)

(58) Field of Classification Search
None
See application file for complete search history.

(56) References Cited

U.S. PATENT DOCUMENTS

| | | | |
|---|---|---|---|
| 7,406,688 B2 * | 7/2008 | Shibayama | G06F 9/5066 718/101 |
| 8,352,621 B2 * | 1/2013 | Di Balsamo | G06F 9/505 709/224 |
| 2003/0149737 A1 * | 8/2003 | Lambert | G06F 17/30902 709/214 |
| 2007/0233761 A1 * | 10/2007 | Mouttet | G06F 7/607 708/204 |
| 2017/0255872 A1 * | 9/2017 | Hamze | G06N 99/002 |

* cited by examiner

*Primary Examiner* — Gregory A Kessler
(74) *Attorney, Agent, or Firm* — Osha Liang LLP

(57) ABSTRACT

A method of managing computing resources and reducing execution time. The method includes: receiving, by a computing resource scheduler, a request to calculate a first value based on a first input data set; initiating, by the computing resource scheduler and on a plurality of computing resources, parallel execution of a plurality of processes to calculate the first value, where each of the plurality of processes is configured to independently calculate the first value based on the first data set; receiving, by the computing resource scheduler, the first value from a first winning process of the plurality of processes; and freeing the plurality of computing resources by aborting a losing process of the plurality of processes in response to receiving the first value from the first winning process.

20 Claims, 4 Drawing Sheets

MANAGING COMPUTING RESOURCES AND REDUCING EXECUTION TIME USING PARALLEL PROCESSES

BACKGROUND

In computational complexity theory, it is known that the time to solve some complex computational problems increases rapidly as the size of the problem increases. The execution time of a process to solve such a computational problem is not easily calculable a priori, and is different among multiple algorithms, with radically different approaches for the same computational problem. Further, it is difficult or impossible to know in advance which algorithm to choose as the most efficient process to solve a given problem.

Among the complex computational problems is a decision problem categorized as nondeterministic polynomial time-complete. Once a solution to such a problem is given, it can be verified quickly, although there is no known efficient process to find the solution. Examples of such problems include a graph problem, finding nearly-connected loops in a two-dimensional graph, often mapped as the Traveling Salesman problem, and the prime factorization problem, which is central to modern forms of cryptography.

Regardless of the issues with these complex computational problems, users still wish to quickly solve these complex computational problems. Moreover, as computational resources are finite, users must carefully manage the computational resources.

SUMMARY OF INVENTION

In general, in one aspect, the invention is related to a method for managing computing resources and reducing execution time. The method comprises: receiving, by a computing resource scheduler, a request to calculate a first value based on a first input data set; initiating, by the computing resource scheduler and on a plurality of computing resources, parallel execution of a plurality of processes to calculate the first value, wherein each of the plurality of processes is configured to independently calculate the first value based on the first data set; receiving, by the computing resource scheduler, the first value from a first winning process of the plurality of processes; and freeing the plurality of computing resources by aborting a losing process of the plurality of processes in response to receiving the first value from the first winning process.

In general, in one aspect, the invention is related to a system for managing computing resources and reducing execution time. The system comprises a plurality of computing resources executing a plurality of processes based on a first data set; and a computing resource scheduler connected to the plurality of computing resources that: receives a request to calculate a first value based on the first data set; initiates parallel execution of the plurality of processes to calculate the first value, wherein each of the plurality of processes is configured to independently calculate the first value based on the first data set; receives the first value from a first winning process of the plurality of the processes; and frees the plurality of computing resources by aborting a losing process of the plurality of processes in response to receiving the first value from the first winning process.

In general, in one aspect, the invention is related to a non-transitory computer readable medium storing instructions for managing computing resources and reducing execution time. The instructions comprising functionality that receives a request to calculate a first value based on a first input data set; initiates, on a plurality of computing resources, parallel execution of a plurality of processes to calculate the first value, wherein each of the plurality of processes is configured to independently calculate the first value based on the first data set; receives the first value from a first winning process of the plurality of processes; and frees the plurality of computing resources by aborting a losing process of the plurality of processes in response to receiving the first value from the first winning process.

Other aspects and advantages of the invention will be apparent from the following description and the appended claims.

DETAILED DESCRIPTION

Figure 1:
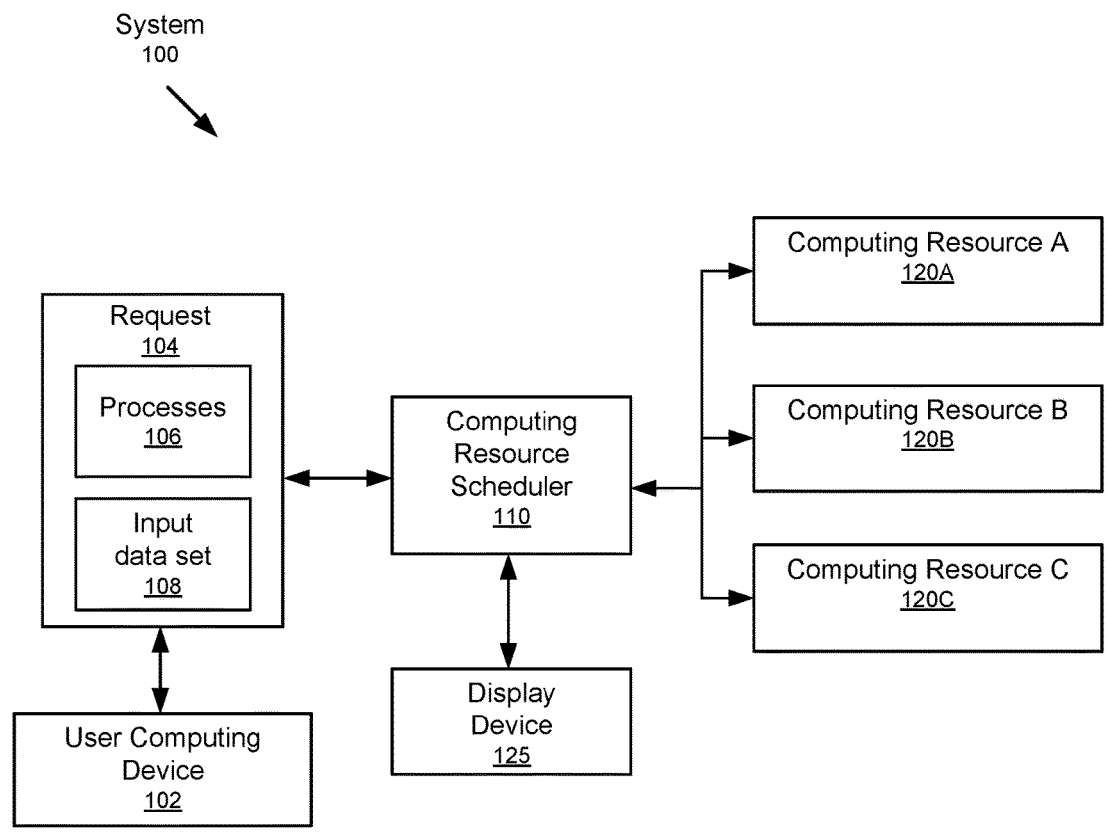
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide for a method, a system, and a non-transitory computer readable medium for managing computing resources (e.g., processor cores of a single computer device, timeslots on a single processor, memory, processors, circuitry, buses, buffers, etc.) and reducing execution time by parallel execution of multiple processes (e.g., algorithms). Upon receiving a request to calculate a value based on an input data set, a computing resource scheduler initiates parallel execution of the multiple processes to independently calculate the value on multiple computing resources. The computing resource scheduler receives the value from a winning process of the multiple processes. The computing resource scheduler aborts the remaining processes (i.e., losing processes) to free and thus make available the computing resources. The computing resource scheduler may display the value calculated by the winning process. Additionally or alternatively, the computing resource scheduler may send the value to the output location (e.g., printer, memory location, hard disk, etc.) as soon as it is available.

FIG. 1 shows a system (100) in accordance with one or more embodiments of the invention. As shown in FIG. 1, the system (100) has many components, including for example, a user computing device (102), a computing resource scheduler (110), and one or more computing resources (i.e., computing resource A (120A), computing resource B (120B), computing resource C (120C)). The computing resource scheduler receives a request (104) to execute multiple processes to calculate a value based on an input data set (108). Each of these components is discussed below.

In one or more embodiments of the invention, the system (100) includes the user computing device (102). The user computing device (102) may be a mobile computer device (e.g., smart phone, tablet computer, laptop, e-reader, etc.), a desktop personal computer (PC), a kiosk, a server, a mainframe, a cable box, etc. The user computing device (102) is operated by a user and may utilize one or more graphical user interfaces (GUIs) (not shown) to generate requests from the user and/or display information to the user. One or more requests generated by the user computing device (102) may be a request (104) to solve a complex computational problem based on an input data set (108). In other words, the request might include the input data set (108) and the input data set (108) is an input to each process (i.e., the process operates on the input data set). The request (104) might also specify multiple processes (106), each of which could independently solve the complex computational problem. In other words, in one or more embodiments, each process may be a different algorithm to calculate the value based on the input data set (108).

In one or more embodiments of the invention, the user computing device (102) sends the request (104) specifying the processes to calculate a value based on the input data set (108). In other words, the user computing device (102) may generate and issue a computing job (e.g., calculating the value by executing the processes (106)) based on the input data set (108). The value may be a solution to a problem of any computational complexity (e.g., NP complete problems, NP hard problems, etc.) for an input data set (108) of any size, with various types of associated processes (106). The computing job may specify an output location (e.g., display device (125), storage location, printer, etc.) that is selected by the user. For example, the selected display device may be the display that is closest to the user. As another example, the storage location may be on the user's computing device or at a remote storage site.

In one or more embodiments of the invention, the system (100) has the multiple computing resources (120A-120C). Each of the computing resources (120A-120C) executes one of the multiple processes (106) to find the value based on the input data set (108). Each of the computing resources (120A-120C) may correspond to a mobile computer device (e.g., smart phone, tablet computer, laptop, e-reader, etc.), a desktop personal computer (PC), a kiosk, a server, a mainframe, a cable box, etc. Each of the computing resources (120A-120C) may correspond to a processor, a processor core, non-consecutive execution timeslots on a single processor, memory, circuitry, address and data buses, buffers, etc. Moreover, each of the computing resources (120A-120C) may be shared by any number of systems (not shown) and may also be executing other processes unrelated to the request sent by the user. In one or more embodiments, computing resource A (120A) is a set of non-consecutive execution timeslots on a processor, computing resource B (120B) is a different set of non-consecutive execution timeslots on the same processor, and computing resource C (120C) is yet another set of non-consecutive execution timeslots on the same processor.

In one or more embodiments of the invention, the computing resources (120A-120C) are processor cores of a single computer device. Additionally or alternatively, no two of the computing resources (120A-120C) are located in the same place. For example, two computing resources may be located in different rooms, different offices, different buildings, different cities, etc. Additional computing resources may be added to the system (100) at any time. Similarly, computing resources may be removed from the system (100) at any time.

In one or more embodiments of the invention, the multiple computing resources may correspond to multiple non-consecutive execution timeslots of a single computer device. The multiple processes are executed in an alternating time-sharing pattern on the single computer device. The single computer device may correspond to a mobile computer device (e.g., smart phone, tablet computer, laptop, e-reader, etc.), a desktop personal computer (PC), a kiosk, a server, a mainframe, a cable box, etc.

In one or more embodiments of the invention, the system (100) includes the computing resource scheduler (110). The computing resource scheduler (110) may be a mobile computer device (e.g., smart phone, tablet computer, laptop, e-reader, etc.), a desktop personal computer (PC), a kiosk, a server, a mainframe, a cable box, etc. The computing resource scheduler (110) is connected to the user computing device (102) and the multiple computing resources (120A-120C). These connections may be direct (e.g., by a universal serial bus (USB) connection) or by a network(s) having wired and/or wireless segments. Although the computing resource scheduler (110) is shown in FIG. 1 as external to the user computing device (102) and all of the computing resources (120A-120C), in other embodiments, the computing resource scheduler (110) may be located on the user computing device (102) or on one of the computing resources (120A-120C).

In one or more embodiments of the invention, the computing resource scheduler (110) maintains a data structure (e.g., list, array, database, etc.) for the multiple computing resources (120A-120C). The data structure may store/identify the multiple computing resources (120A-120C), the software and software version executing on each of the multiple computing resources (120A-120C), the process or processes already installed on each of the computing resources (120A-120C), the bandwidth of each of the multiple computing resources (120A-120C), etc. The computing resource scheduler (110) may populate and maintain this data structure using any combination of discovery and monitoring protocols.

In one or more embodiments of the invention, the computing resource scheduler (110) receives the request (104) and initiates parallel execution of the processes on the multiple computing resources (120A-120C) to calculate the value based on the input data set. Initiating the parallel execution may include sending a start message to each of the computing resources (120A-120C) with the input data set (108) extracted from the request (104). The processes (106) might already be installed (i.e., present and ready for execution) on the computing resources (120A-120C). If a process specified in the processes (106) is not already installed on the computing resources (120A-120C), the computing resource scheduler (110) may include the code or code segment for the missing process in the start message to one of the computing resources (120A-120C). In other words, the start message sent to one of the computing resources (120A-120C) may include source code or binary/machine code for execution on the computing resource (120A-120C) to calculate the value.

The computing resource scheduler (110) may designate the first process that returns the value as the winning process. The computing resource scheduler (110) may designate the remaining processes as losing processes. The likelihood of becoming the winning process may depend, in part, on the types of the processes (106) the input data set (108), and the specialized capabilities, if any, of the computing resources (120A-120C), executing the processes and may not be known a priori. Those skilled in the art, having the benefit of this detailed description, will appreciate that by having multiple different processes solve the problem in parallel, the time to solve the problem is reduced. Specifically, the process that can solve the problem the fastest, although not known a priori, is invoked along with its slower counterparts to independently solve the problem.

In one or more embodiments of the invention, the computing resource scheduler (110) sends a termination message to the computing resources executing the losing processes. The termination message is effectively a request from the computing resource scheduler (110) for the computing resources executing the losing processes to cease (e.g., abort, cancel, terminate, etc.) the execution of the losing processes because the winning process has already provided the value for the input data set (108). The computing resource scheduler (110) may send the calculated value to the output location specified in the computing job for displaying or storing. For example, if the output location is the display device (125), the computing resource scheduler (110) may send the value to the display device (125) to display the value to the user. Those skilled in the art, having the benefit of this detailed description, will appreciate that by terminating the losing processes as soon as the winning process finishes, the computing resources (e.g., processor cores of a single computer device, memory, processors, address or data buses, buffers, circuitry, etc.) being occupied by the losing processes become available for other processes and computing jobs. This frees up the computing resources.

In one or more embodiments, a single request may include multiple input data sets. Additionally or alternatively, each of these multiple input data sets may be sent in its own request, and these multiple request are sent one after the other. In one or more embodiments of the invention, after receiving the multiple input data sets, the computing resource scheduler (110) sends start messages to the computing resources (120A-120C). Each one of these start messages includes the ordered multiple input data sets. The start message may include a flag indicating that executing the processes (108) should be done based on the multiple input data sets (108) consecutively. In other words, in response to the flag, a process executes based on the first input data set until either: (i) a termination message is received (i.e., the process is one of the losing processes for the current data set); or (ii) the process successfully calculates the value based on the first input data set (i.e., the process is the winning process for the current data set). When either event takes place, the process is then executed based on the second input data set. This repeats until the last input data set is reached.

In one or more embodiments, a process may be capable of calculating multiple values based on a single input data set (e.g., calculating the numerous factors of a large number). Moreover, the multiple values might not all be available at the same time. In such embodiments, the start message may include a flag indicating that every time one of the calculated values is available, it should be transmitted back to the computing resource scheduler (110). The computing resource scheduler (110) may send a termination message to the other computing resources executing the losing processes. Moreover, in response to the termination message, the computing resources executing the losing processes may both: (i) cease (e.g., abort, cancel, terminate, etc.) executing the processes; and (ii) start/initiate executing the processes for a next value. Additionally or alternatively, the termination message may include an instruction to simplify the input data set (108) using the value(s) that have been found for the next execution of the processes. The computing resource running the winning process may immediately start executing the process to calculate a next value without receiving the termination message.

For example, the single input data set may be the integer "210" and the multiple values to be calculated are its prime factors (i.e., 2, 3, 5, and 7). When a winning process finds 7, the computing resource scheduler sends a termination message to the computing resources running losing processes to (i) cease the execution and (ii) start/initiate the processes to find a prime factor of 30, since 7 has already been calculated and 7×30=210.

In one or more embodiments of the invention, the computing resource scheduler (110) may aggregate (e.g., assemble, combine, etc.) the values for the input data set (108) and send them to the output location (e.g., display device (125)).

Figure 2:
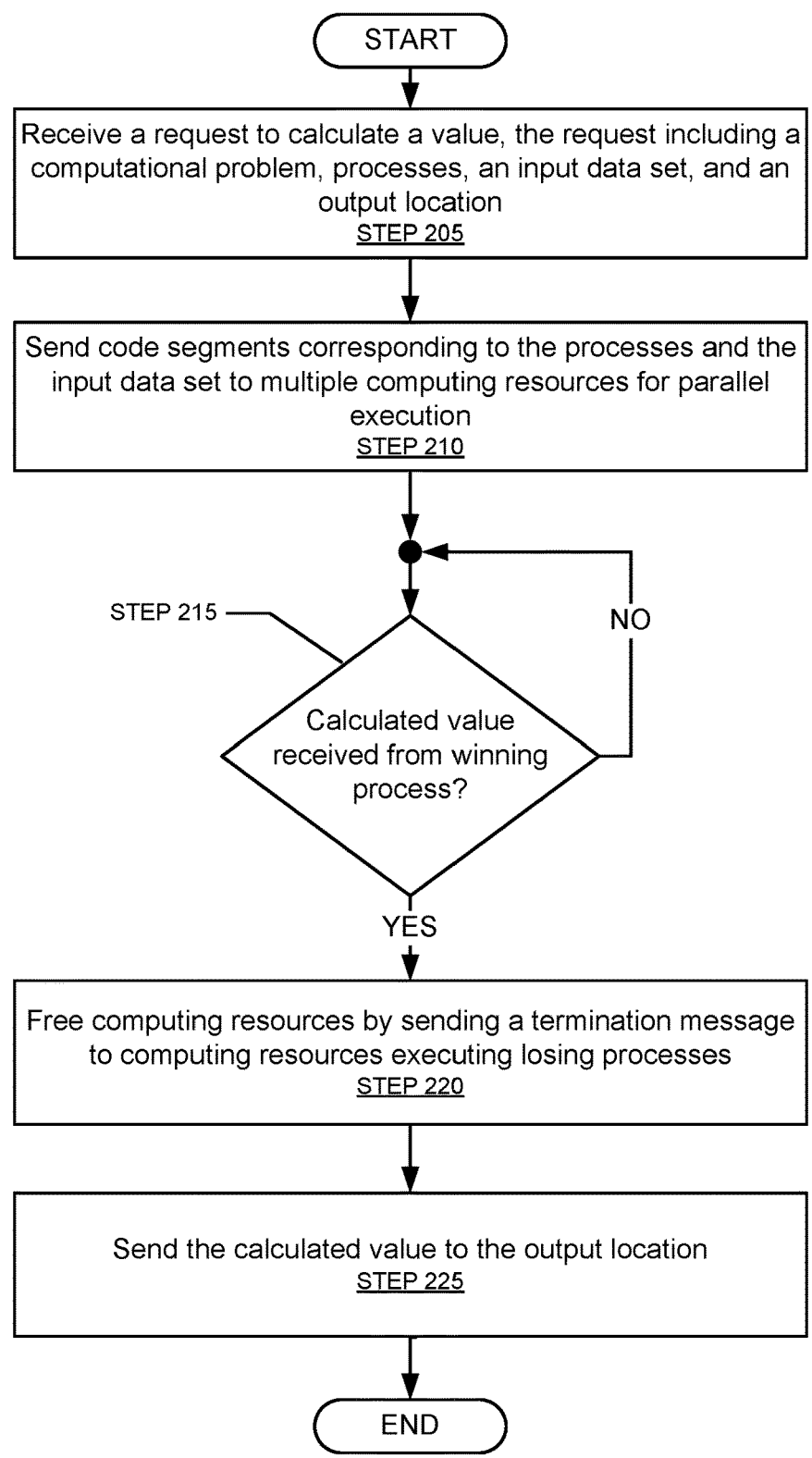
FIGS. 2 and 3 show flowcharts in accordance with one or more embodiments of the invention.

FIG. 2 shows a flowchart in accordance with one or more embodiments of the invention. The flowchart depicts a process for managing computing resources and reducing execution time. One or more of the steps in FIG. 2 may be performed by the components of the system (100), discussed above in reference to FIG. 1. In one or more embodiments of the invention, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Initially, the computing resource scheduler receives a request to calculate a value based on an input data set (STEP 205). The value may be a solution to a problem of any computational complexity (e.g., NP complete problems, NP hard problems, etc.) for an input data set of any size, with various types of associated processes. The request may specify an output location (e.g., display device, storage location, printer, etc.) that is selected by the user. The output location may correspond to a display or a storage location selected by a user. For example, the selected display may be the display that is closest to the user. As another example, the storage location may be on the user's computing device or at a remote storage site.

In one or more embodiments of the invention, the value may be a solution to a graph theoretical problem, for example, finding nearly-connected loops in a two-dimensional graph. Such a graph theoretical problem is computationally similar to the Traveling Salesman Problem, a decision problem asking the following question: Given a list of cities and the distances between each pair of cities, what is the shortest possible route that visits each city exactly once and returns to the origin city? In such embodiments, associated processes to find the value are grouped into exact algorithms and approximation algorithms. The exact algorithms include exhaustive search and dynamic or linear programming. The approximation algorithms include genetic algorithms, simulated annealing, ant colony optimization.

In one or more embodiments of the invention, the computational problem is the prime factoring problem, given a positive integer, finding a prime number to divide the given integer exactly. In such embodiments, associated processes to find the value are grouped into Category 1 algorithms and Category 2 algorithms. Category 1 algorithms include Pollard's rho algorithm and elliptic curve factorization. Category 2 algorithms include sieve approaches and Dixon's algorithm.

In STEP 210, the computing resource scheduler sends code segments corresponding to the processes and the input data set to the multiple computing resources. The code segments and input data set may be part of a start message sent to a computing resource. Different computing resources may receive different code segments. If the computing resource already has the process installed, the code segment might be omitted from the start message. Each of the computing resources executes one of the processes to find the value based on the input data set. In one or more embodiments, it is unknown a priori which process will finish the calculation first.

As discussed above, a computing resource may correspond to any combination of memory, processors, processor cores, circuitry, address and data buffers, buses, buffers, etc. As also discussed above, multiple computing resources may correspond to multiple non-consecutive execution timeslots of a single computer device. The multiple processes (108) are executed in an alternating time-sharing pattern on the single computer device. The single computer device may correspond to a mobile computer device (e.g., smart phone, tablet computer, laptop, e-reader, etc.), a desktop personal computer (PC), a kiosk, a server, a mainframe, a cable box, etc.

In STEP 215, the computing resource scheduler determines whether the value has been received from at least one of the computing resources. As discussed above, the computing resources independently start executing the processes based on the input data set upon receiving the start message. The first process to finish calculating the value and send back the value is designated as the winning process. In one or more embodiments of the invention, if multiple values are being received in parallel from multiple processes, the first process to complete the sending of its value may be designated as the winning process. When the computing resource scheduler determines that the value has been received, the process proceeds to STEP 220. When the computing resource scheduler determines that the value has not yet been received, the process waits (i.e., returns to STEP 215).

In STEP 220, the computing resource scheduler (110) sends a termination message to the computing resources executing the losing processes to free the computing resources. All processes, except the winning process, may be designated as losing processes. The termination message is effectively a request for the computing resources executing the losing processes to cease (e.g., abort, cancel, terminate, etc.) the execution of the losing processes because the winning process has already provided the value.

In STEP 225, the computing resource scheduler (110) sends the value to the output location. If the output location is a display, the display may display the value. If the output location is a storage location, the value may be saved at the storage location for future retrieval and printing.

Those skilled in the art, having the benefit of this detailed description will appreciate that the process depicted in FIG. 2 may be repeated for any number of input data sets, values, and/or computational problems of various types. Moreover, those skilled in the art, having the benefit of this detailed description, will appreciate that executing multiple processes in parallel may reduce execution time without having to estimate, in advance, which process will be the winning process.

Figure 3:
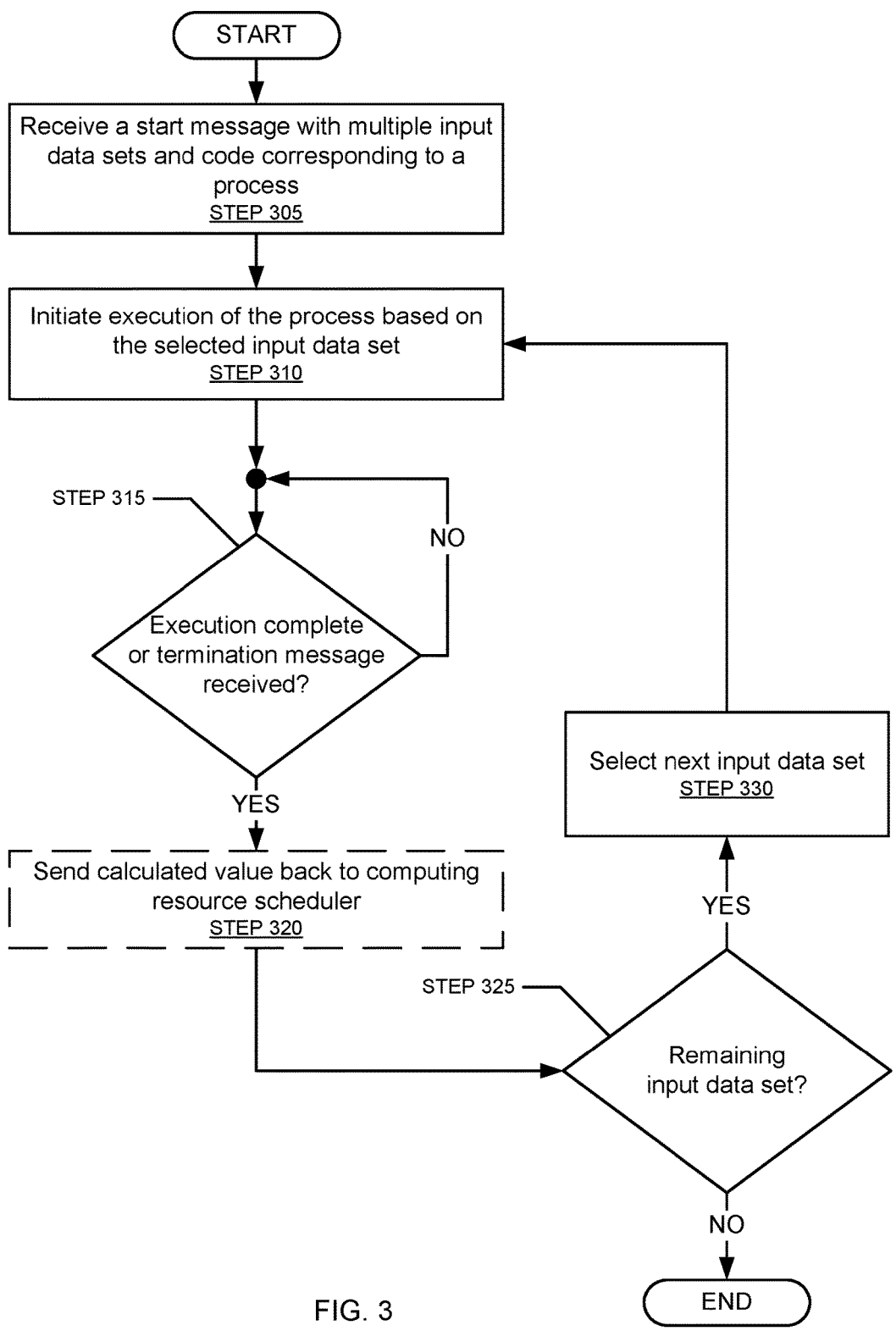

FIG. 3 shows a flowchart in accordance with one or more embodiments of the invention. The flowchart depicts a process for managing computing resources and reducing execution time. One or more of the steps in FIG. 3 may be performed by the components of the system (100), discussed above in reference to FIG. 1. In one or more embodiments of the invention, one or more of the steps shown in FIG. 3 may be omitted, repeated, and/or performed in a different order than the order shown in FIG. 3. Accordingly, the scope of the invention should not be considered limited to the specific arrangement of steps shown in FIG. 3.

Initially, each of the computing resources receives a start message with multiple input data sets and optionally code corresponding to a process (STEP 305). If the process is already installed (i.e., present and ready for execution), the code may be omitted from the start message. However, if the process is not already installed, the computing resource scheduler may include the code or code segment for the missing process in the start message.

In STEP 310, an input data set may be selected from the multiple input data sets for the computational problem. Each of the computing resources initiates execution of the process based on the selected input data set. The input data set may be selected in advance by the user. Alternatively, the current input data set may be chosen randomly by the computing resource. Additionally or alternatively, the input data sets may be ordered in the start message. Each of the multiple input data sets may be the same size. Alternatively, different input data sets may be different sizes.

In STEP 315, it is determined whether the process has found the value (i.e., the execution of the process has been completed) or whether a termination message has been received by the computing resource, indicating that another computing resource executing another process in parallel has found the value. As discussed above, multiple computing resources independently start executing processes based on the current input data set upon receiving the request. The termination message is effectively a request for the computing resources still executing the losing processes to cease (e.g., abort, cancel, terminate, etc.) the execution of the processes because one process (i.e., the winning process) has already provided the value for the current input data set.

When the execution has been completed or a termination message has been received, the process proceeds to STEP 320. When the execution has not been completed or a termination message has not been received, the process waits (i.e., returns to STEP 315).

In STEP 320, the computing resource sends the calculated value back to the computing resource scheduler. STEP 320 is optional and only applies if the computing resource is executing the winning process. In other words, STEP 320 does not apply if the computing resource ceased execution of the process because a termination message was received.

In STEP 325, the computing resource determines whether the process has executed on all of the multiple input data sets. When the computing resource determines that the process has not executed based on at least one of the multiple input data sets, the process proceeds to STEP 330. When the computing resource determines that all of the input data sets have been received, the process proceeds to STEP 330.

In STEP 330, a next input data set may be selected from the multiple input data sets for the computational problem. As discussed above, the multiple input data sets may be ordered in the start message (STEP 305). The process returns to STEP 310.

As shown in FIG. 3, there may be multiple iterations of STEPS 310-330. During each iteration, the process that finds a value first will be designated as the winning process, while the remaining processes will be designated losing processes. Those skilled in the art, having the benefit of this detailed description, will appreciate that the winning process in the current iteration may become a losing process in the next iteration. The reverse is true for a losing process in the current iteration. The likelihood of becoming the winning process may depend, in part, on input data and the specialized capabilities, if any, of the computing resources.

Figure 4:
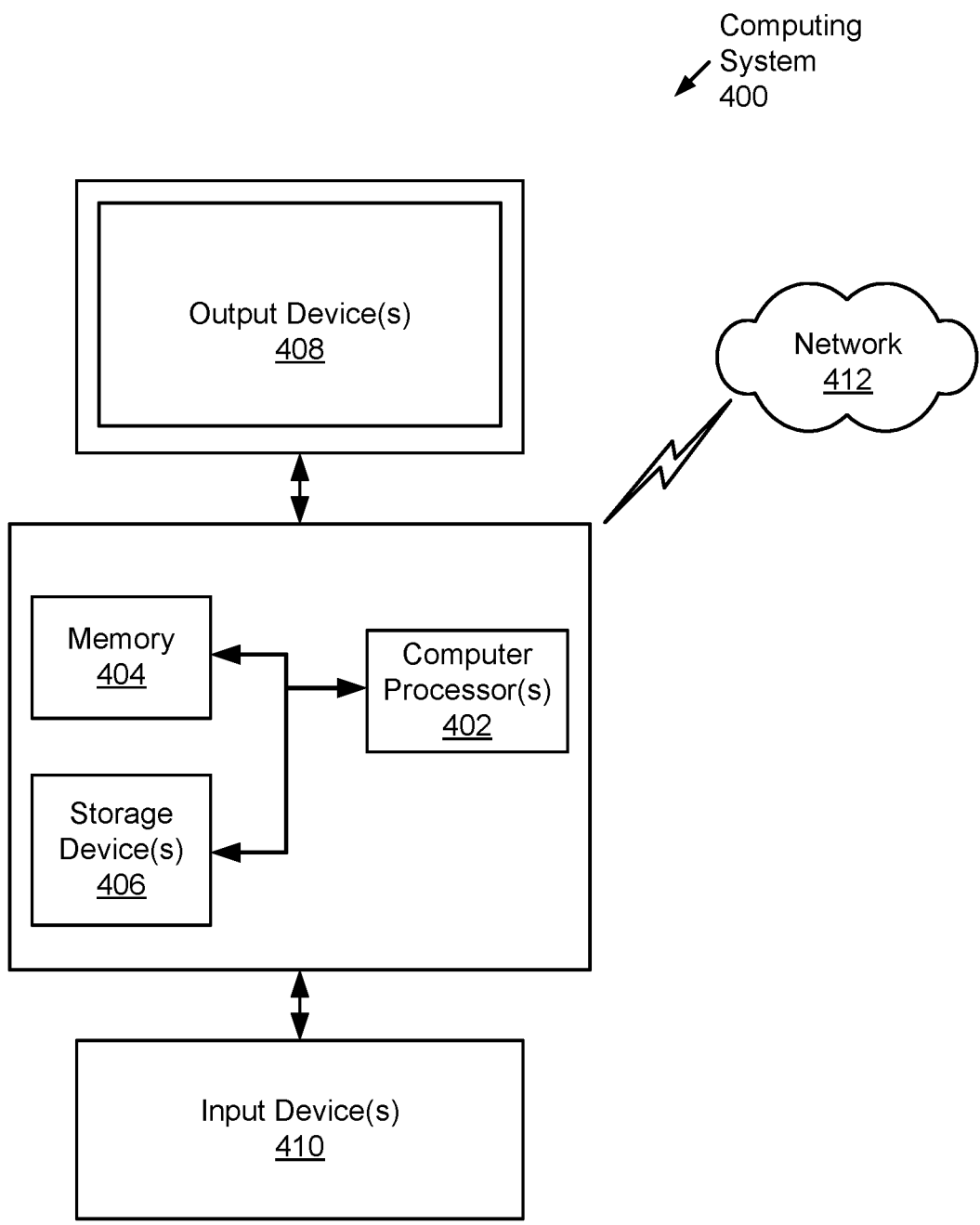
FIG. 4 shows a computer system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The processor(s) (402) may be an integrated circuit for processing instructions. For example, the processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), performs embodiments of the invention.

Further, one or more elements of the aforementioned computing system (400) may be located at a remote location and connected to the other elements over a network (412). Further, one or more embodiments of the invention may be implemented on a distributed system having a plurality of nodes, where each portion of the invention may be located on a different node within the distributed system. In one or more embodiments of the invention, the node corresponds to a distinct computing device. Alternatively, the node may correspond to a processor with associated physical memory. The node may alternatively correspond to a processor or micro-core of a processor with shared memory and/or resources.

While the invention has been described with respect to a limited number of embodiments, those skilled in the art, having benefit of this disclosure, will appreciate that other embodiments can be devised without departing from the scope of the invention as disclosed herein. Accordingly, the scope of the invention should be limited only by the attached claims.

What is claimed is:

1. A method of managing computing resources and reducing execution time, comprising:
   receiving, by a computing resource scheduler, a request to calculate a first value based on a first input data set;
   initiating, by the computing resource scheduler and on a plurality of computing resources, parallel execution of a plurality of processes to calculate the first value, wherein each of the plurality of processes is configured to independently calculate the first value based on the first data set;
   receiving, by the computing resource scheduler, the first value from a winning process of the plurality of processes, wherein the winning process is a single process among the plurality of processes that is completed in a least amount of time; and
   freeing the plurality of computing resources by aborting a losing process of the plurality of processes in response to receiving the first value from the winning process.

2. The method of claim 1, wherein the plurality of computing resources corresponds to a plurality of computing devices connected to the computing resource scheduler by a network, and wherein each of the computing devices executes only one of the plurality of processes.

3. The method of claim 1, wherein the plurality of computing resources corresponds to a plurality of timeslots on a single computing device, and wherein the plurality of processes are executed in an alternating time-sharing pattern on the single computing device.

4. The method of claim 1, wherein the first value is a solution to the Traveling Salesman Problem.

5. The method of claim 1, wherein the first value is a solution to a prime factoring problem.

6. The method of claim 1, wherein the request specifies the plurality of processes.

7. The method of claim 1, wherein initiating parallel execution comprises:
   sending, by the computing resource scheduler, a plurality of code segments corresponding to the plurality of processes to the plurality of computing resources.

8. The method of claim 1, further comprising:
   receiving, by the computing resource scheduler, a request to calculate a second value based on a second data set; and
   sending, by the computing resource scheduler, the second data set to the plurality of computing resources before initiating parallel execution of the plurality of processes to calculate the first value,
   wherein the winning process initiates calculation of the second value based on the second data set after sending the first value to the computing resource scheduler,
   wherein aborting the losing process comprises sending a termination message to the losing process, and
   wherein the losing process ceases calculation of the first value and initiates calculation of the second value based on the second data set in response to the termination message.

9. The method of claim 1, wherein:
aborting the losing process comprises sending, by the computing resource scheduler, a termination message comprising the first value to the comprising losing process;
the losing process ceases calculation of the first value and initiates calculation of a second value based on the first value in response to the termination message; and
the winning process initiates calculation of the second value based on the first value after sending the first value to the computing resource scheduler.

10. A system for managing computing resources and reducing execution time, comprising:
a plurality of computing resources executing a plurality of processes based on a first data set, wherein the plurality of computing resources comprises a processor coupled to a memory; and
a computing resource scheduler connected to the plurality of computing resources that:
receives a request to calculate a first value based on the first data set;
initiates parallel execution of the plurality of processes to calculate the first value, wherein each of the plurality of processes is configured to independently calculate the first value based on the first data set;
receives the first value from a winning process of the plurality of the processes, wherein the winning process is a single process among the plurality of processes that is completed in a least amount of time; and
frees the plurality of computing resources by aborting a losing process of the plurality of processes in response to receiving the first value from the winning process.

11. The system of claim 10, wherein the plurality of computing resources corresponds to a plurality of computing devices connected to the computing resource scheduler by a network, and wherein each of the computing devices executes only one of the plurality of processes.

12. The system of claim 10, wherein the plurality of computing resources corresponds to a plurality of timeslots on a single computing device, and wherein the plurality of processes are executed in an alternating time-sharing pattern on the single computing device.

13. The system of claim 10, wherein the computing resource scheduler also:
receives a request to calculate a second value based on a second data set; and
sends the second data set to the plurality of computing resources before initiating parallel execution of the plurality of processes to calculate the first value,
wherein the winning process initiates calculation of the second value based on the second data set after sending the first value to the computing resource scheduler,
wherein aborting the losing process comprises sending a termination message to the losing process, and
wherein the losing process ceases calculation of the first value and initiates calculation of the second value based on the second data set in response to the termination message.

14. The system of claim 10, wherein:
aborting the losing process comprises sending, by the computing resource scheduler, a termination message comprising the first value to the comprising losing process;
the losing process ceases calculation of the first value and initiates calculation of a second value based on the first value in response to the termination message; and
the winning process initiates calculation of the second value based on the first value after sending the first value to the computing resource scheduler.

15. The system of claim 10, further comprising a display device that displays the first value.

16. A non-transitory computer-readable medium storing computer-readable program code embodied therein that operates a computing resource schedule, the computing resource scheduler:
receives a request to calculate a first value based on a first input data set;
initiates, on a plurality of computing resources, parallel execution of a plurality of processes to calculate the first value, wherein each of the plurality of processes is configured to independently calculate the first value based on the first data set;
receives the first value from a winning process of the plurality of processes, wherein the winning process is a single process among the plurality of processes that is completed in a least amount of time; and
frees the plurality of computing resources by aborting a losing process of the plurality of processes in response to receiving the first value from the winning process.

17. The non-transitory computer-readable medium of claim 16, wherein the plurality of computing resources corresponds to a plurality of timeslots on a single computing device, and wherein the plurality of processes are executed in an alternating time-sharing pattern on the single computing device.

18. The non-transitory computer-readable medium of claim 16, wherein the request specifies the plurality of processes.

19. The non-transitory computer-readable medium of claim 16, wherein the computing resource scheduler also:
receives a request to calculate a second value based on a second data set; and
sends the second data set to the plurality of computing resources before initiating parallel execution of the plurality of processes to calculate the first value,
wherein the winning process initiates calculation of the second value based on the second data set after sending the first value to the computing resource scheduler,
wherein aborting the losing process comprises sending a termination message to the losing process, and
wherein the losing process ceases calculation of the first value and initiates calculation of the second value based on the second data set in response to the termination message received from the computing resource scheduler.

20. The non-transitory computer-readable medium of 16, wherein:
aborting the losing process comprises sending a termination message comprising the first value to the comprising losing process;
the losing process ceases calculation of the first value and initiates calculation of a second value based on the first value in response to the termination message received from the computing resource scheduler; and
the winning process initiates calculation of the second value based on the first value after sending the first value to the computing resource scheduler.

\* \* \* \* \*